United States Patent
Xia et al.

(10) Patent No.: US 11,015,069 B2
(45) Date of Patent: May 25, 2021

(54) SURFACE TREATMENT FORMULATION FOR INHIBITING SCALING OR CLIMBING OF A SURFACE

(71) Applicant: The Johns Hopkins University, Baltimore, MD (US)

(72) Inventors: Zhiyong Xia, Rockville, MD (US); Adam J. Maisano, Sykesville, MD (US); Lance M. Baird, Los Angeles, CA (US); Adam W. Freeman, Laurel, MD (US); Sara E. Kubik, Mount Airy, MD (US); Dawnielle Farrar-Gaines, Reisterstown, MD (US)

(73) Assignee: The Johns Hopkins University, Baltimore, MD (US)

( * ) Notice: Subject to any disclaimer, the term of this patent is extended or adjusted under 35 U.S.C. 154(b) by 53 days.

(21) Appl. No.: 16/241,132

(22) Filed: Jan. 7, 2019

(65) Prior Publication Data
US 2019/0352517 A1    Nov. 21, 2019

Related U.S. Application Data

(60) Provisional application No. 62/672,126, filed on May 16, 2018.

(51) Int. Cl.
| | | |
|---|---|---|
| *C09D 7/61* | (2018.01) | |
| *C09D 7/40* | (2018.01) | |
| *C09D 133/00* | (2006.01) | |
| *C08K 3/04* | (2006.01) | |
| *B05D 3/12* | (2006.01) | |
| *B05D 3/06* | (2006.01) | |
| *C08K 3/34* | (2006.01) | |
| *C08L 83/04* | (2006.01) | |

(52) U.S. Cl.
CPC ............. *C09D 7/61* (2018.01); *B05D 3/065* (2013.01); *B05D 3/12* (2013.01); *C08K 3/04* (2013.01); *C08K 3/34* (2013.01); *C09D 7/69* (2018.01); *C09D 133/00* (2013.01); *C08K 2201/005* (2013.01); *C08L 83/04* (2013.01)

(58) Field of Classification Search
CPC .......... C09D 7/61; C09D 7/69; C09D 133/00; C08K 3/04; C08K 2201/005; C08K 3/34; C08L 83/04; B05D 3/12; B05D 3/067
USPC ......................................................... 524/456
See application file for complete search history.

(56) References Cited

U.S. PATENT DOCUMENTS

| | | | | |
|---|---|---|---|---|
| 5,928,778 A | * | 7/1999 | Takahashi ................. | C09D 7/69 428/323 |
| 2015/0344712 A1 | * | 12/2015 | Harrison ................. | B05D 3/065 428/206 |
| 2017/0073605 A1 | * | 3/2017 | Sasaki ................... | C10M 103/00 |

* cited by examiner

*Primary Examiner* — Hui H Chin
(74) *Attorney, Agent, or Firm* — Todd R. Farnsworth (57) ABSTRACT

A surface treatment formulation configured to inhibit scaling or climbing of a surface is provided. The surface treatment formulation may include a base binding material configured to adhere to the surface and a filler material embedded in the base binding material. The filler material may include a dry lubricant having a layered lamellar structure or low inter filler interaction. Furthermore, the surface treatment formulation may be configured to be activated in order to expose the filler material thereby causing formation of a slippery surface to inhibit the scaling or climbing of the surface.

20 Claims, 6 Drawing Sheets

SURFACE TREATMENT FORMULATION FOR INHIBITING SCALING OR CLIMBING OF A SURFACE

This application claims the benefit of U.S. Provisional Application No. 62/672,126 filed on May 16, 2018, the entire contents of which are hereby incorporated herein by reference.

STATEMENT OF GOVERNMENTAL INTEREST

This invention was made with U.S. Government support under contract number SAQMMA16C0355 awarded by the U.S. Department of State. The government has certain rights in the invention.

TECHNICAL FIELD

Exemplary embodiments of the present disclosure generally relate to a surface treatment formulation that is configured to inhibit scaling or climbing of a surface.

BACKGROUND

Many industrial complexes, government facilities, military bases, borders, or the like often have perimeter barriers. These perimeter barriers may be in the form of a wall or the like, which may be used to secure or protect the area or facility the wall surrounds or borders. In this regard, the perimeter barrier may form or be a part of a first round of defense to protect the area or facility the perimeter barrier surrounds or borders. However, without further safeguards or protections, a perimeter barrier or wall may be climbed or scaled by an individual to gain access to the area or facility the perimeter barrier sought to protect. For example, masonry walls may have a high skid resistance value thus making the wall easier to scale by an individual particularly when the individual climbs up a corner where the wall intersects another wall by pushing off between the walls.

BRIEF SUMMARY

Example embodiments herein may enable the provision of a surface treatment formulation. The surface treatment formulation may inhibit scaling or climbing of a surface on which the surface treatment formulation is applied. In this regard, the surface treatment formulation may be configured to decrease the skid resistance, or in other words, make the surface slippery. Accordingly, the surface treatment formulation may make a perimeter barrier at least more difficult to climb or scale.

In one example embodiment, a surface treatment formulation configured to inhibit scaling or climbing of a surface is provided. The surface treatment formulation may include a base binding material configured to adhere to the surface and a filler material embedded in the base binding material. The filler material may include a dry lubricant having a layered lamellar structure or low inter filler interaction. Furthermore, the surface treatment formulation may be configured to be activated in order to expose the filler material thereby causing formation of a slippery surface to inhibit the scaling or climbing of the surface.

In a further example embodiment, a method for reducing skid resistance of a surface is provided. The method may include mixing a filler material with a base binding material to form a surface treatment formulation. The filler material may include a dry lubricant having a layered lamellar structure or low inter filler interaction. The method may further include applying the surface treatment formulation to the surface and activating the surface treatment formulation in order to expose the filler material thereby causing the formation of a slippery surface to reduce the skid resistance of the surface

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true.

As mentioned above, industrial complexes, government facilities, military bases, borders, or the like may have perimeter barriers as a first line of defense or protection. These perimeter barriers may be in the form of a wall or the like, which may be climbable or scalable by individuals, animals (e.g., squirrels, cats, monkeys, etc.), or plants (ivy, vines, etc.). Example embodiments herein are directed to a surface treatment formulation that be applied to an external surface of the wall in order to inhibit scaling or climbing of the wall. In this regard, the surface treatment formulation may be configured to decrease the skid resistance of the surface on which the surface treatment formulation is applied, or in other words, make the surface slippery.

Figure 1:
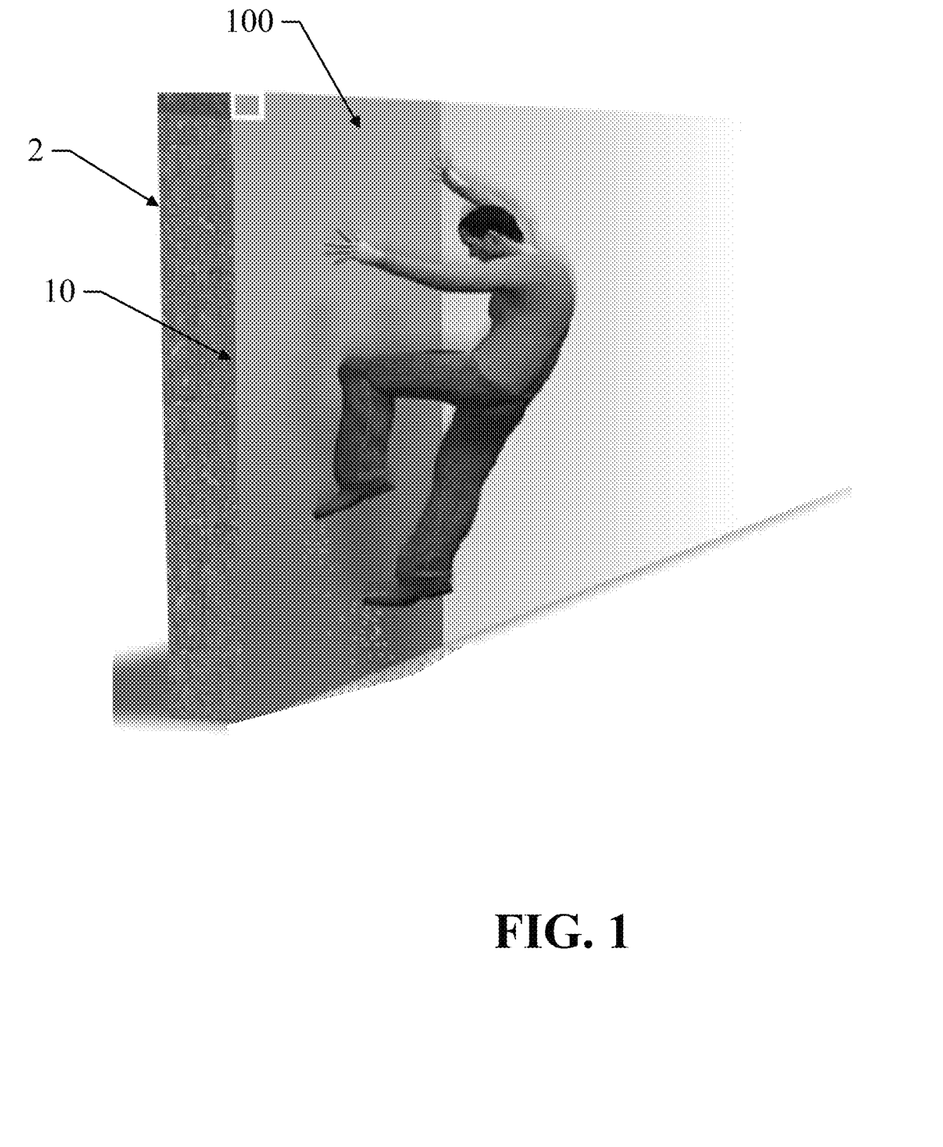
FIG. 1 illustrates a diagrammatic representation of a perimeter barrier with a surface treatment formulation applied thereon in accordance with an example embodiment.

According to example embodiments contained herein, a surface treatment formulation may be provided. FIG. 1 illustrates an example embodiment of a perimeter barrier having a surface treatment formulation applied thereon. As shown in FIG. 1, a perimeter barrier 2 (e.g., a vertically extending wall) may have a surface 10, such as an external surface extending vertically relative to a ground. A surface treatment formulation 100 may be configured to be applied to the surface 10 to decrease the skid resistance of the surface 10. In this regard, the surface treatment formulation 100 may be configured to impart low-friction properties onto the surface 10 of the perimeter barrier 2 to inhibit scaling or climbing of the perimeter barrier 2 by an individual, animal, or plant. In other words, the surface treatment formulation 100 may make the perimeter barrier 2 more difficult to climb or scale by reducing the ability of a potential climber to get a useful grip on the surface 10 of the perimeter barrier 2.

The perimeter barrier 2 illustrated in FIG. 1 may be representative of a wall, protection barrier, building, or the like. However, it should be understood that the perimeter barrier 2 may be any other object, such as any object designed to protect an object, facility, area, or the like known in the art. It should also be understood that the surface 10 of the perimeter barrier 2 may be formed of any material known in the art. For example, the surface 10 may be formed of or from concrete, steel, aluminum, rock, masonry, wood, siding, or the like or any combination thereof.

Figure 2:
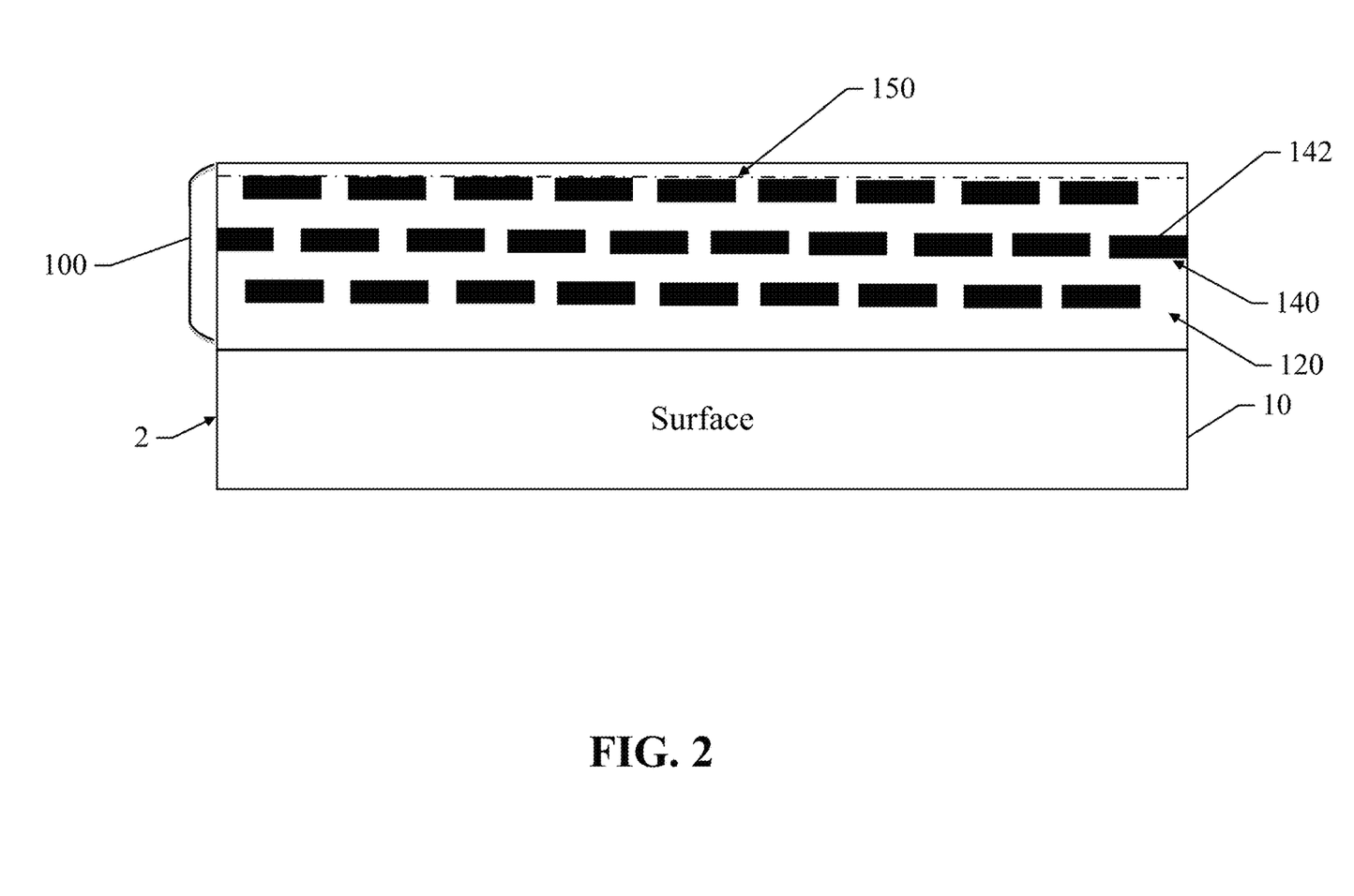
FIG. 2 illustrates a diagrammatic representation of a surface treatment formulation in accordance with an example embodiment.

FIG. 2 illustrates an example embodiment of the surface treatment formulation 100 applied to the surface 10. As shown in FIG. 2, the surface treatment formulation 100 may include a base binding material 120 and a filler material 140. The filler material 140 and the base binding material 120 of the surface treatment formulation 100 may be formulated such that the filler material 140 and the base binding material 120 form a continuous coating on the surface 10.

In accordance with one example embodiment, the filler material 140 and the base binding material 120 may be an integral coating system to be applied to the surface 10. In this regard, the filler material 140 and the base binding material 120 may be mixed together and then applied to the surface 10. However, in accordance with other example embodiments, the base binding material 120 may be first applied to the surface 10 and then the filler material 140 may be applied on the base binding material 120 via spraying (e.g., powder spraying or the like), brushing, or rolling techniques or any other technique known in the art in order to integrate the filler material 140 with the base binding material 120.

The surface treatment formulation 100, for example when the filler material 140 and the base binding material 120 are mixed together before application, may be applied to the surface 10 via brushing or rolling techniques. In this regard, when applying the surface treatment formulation 100 to the surface 10, the surface treatment formulation 100 may applied, via either brushing or rolling, in a vertical direction with respect to the ground if the perimeter barrier 2 is erect, or at least by brushing or rolling in a direction that is parallel to a plane of the surface 10. The surface treatment formulation 100 may be applied in a long vertical continuous stroke in order to align the filler material 140 in parallel to the surface 10. The parallel alignment of the filler material 140 in relation to the surface 10 aids in reducing the skid resistance of the surface 10, as discussed further herein.

The surface treatment formulation 100 may be applied to form a coating on the surface 10 having a thickness about 3 mils to 10 mils (i.e., 75 micrometers to 250 micrometers). The coating may be continuous or non-continuous types. It should be understood that a mil is a thousandth of an inch or, in other words, equal to about 24.5 micrometers. Accordingly, the surface treatment formulation 100 when applied to the surface 10 may have a thickness of at least 3, 4, 5, or 6 mils or at most 7, 8, 9, or 10 mils (e.g., about 5-7 mils, about 6-8 mils, etc.). In other words, when the filler material 140 and base binding material 120 are applied as a mixture, the filler material 140 and the base binding material 120 may form a continuous coating that may applied to the surface 10 at a thickness of about 3 mils to 10 mils (i.e., 75 micrometers to 250 micrometers). However, in other example embodiments, when the base binding material 120 is applied initially to the surface 10, the base binding material 120 may be applied to the surface 10 at a thickness from about 1 mils to 9 mils and then the filler material 140 may be applied to the surface 10 at a thickness from about 1 mils to 9 mils. Accordingly, when the base binding material 120 is applied to the surface 10 initially, the base binding material may be applied to the surface 10 at thickness of at least 1, 2, 3, or 4 mils or at most 5, 6, 7, 8, or 9 mils (e.g., about 3-7 mils, about 4-6 mils, etc.). Then, the filler material 140 may be applied to the surface 10 at thickness of at least 1, 2, 3, or 4 mils or at most 5, 6, 7, 8, or 9 (e.g., about 3-7 mils, about 4-6 mils, etc.).

The base binding material 120, as shown in FIG. 2, of the surface treatment formulation 100 may be a coating or paint that is configured to adhere the components of the surface treatment formulation 100 to the surface 10. According to example embodiments herein, the base binding material 120 may be at least 40-80% by weight of the surface treatment formulation 100. In this regard, the base binding material 120 may form at least 40%, 45%, 50%, 55%, or 60 by weight of the surface treatment formulation 100 or at most 60%, 65%, 70%, 75%, or 80% by weight of the surface treatment formulation 100 (e.g., about 45-55% by weight of the surface treatment formulation 100, about 40-50% by weight of the surface treatment formulation 100, etc.).

In accordance with example embodiments, the base binding material 120 may include a binder component and a solvent component. The binder component of the base binding material 120 may be a resin that is configured to form a matrix to hold or anchor any particles or additives (e.g., pigment or filler material particles as described herein) incorporated or added to the base binding material 120 in suspension. Furthermore, the binder component may also be configured to enable any particles in the surface treatment formulation 100 to adhere or stick to the surface 10. Furthermore, the binder component may be about 10-40% weight of the base binding material 120. In this regard, the binder component may form at least 10%, 15%, 20%, or 25% by weight of the base binding material 140 or at most 25%, 30%, 35%, or 40% by weight of the base binding material 140 (e.g., about 10-30% by weight of the base binding material 140, about 15-25% by weight of the base binding material 140, etc.).

The resin of the binder component of the base binding material 120 may be a polymer resin. The polymer may be any polymer that is configured to withstand certain outside conditions such as wind, rain, snow, extreme temperatures, or the like but yet is 'loose' (or soft) enough (i.e., having a predetermined lower resistance against surface deformation) to release a sufficient or predetermined amount of filler material 140 in response to pressure, friction or the like, as described in more detail below. In this regard, the binder component of the base binding material 120 may be, for example, an acrylic resin, epoxy, polyurethane, alkyd resin, or the like. It should be understood, however, that the base binding material 120 may be chosen based on the filler material 140 being used or vice versa.

As mentioned above, the base binding material 120 may also include the solvent component. The solvent component of the base binding material 120 may be configured to reduce the viscosity of the base binding material 120 in order to ensure the ease of application of the surface treatment formulation 100 on the surface 10. In this regard, the solvent component may be a solvent, water, oil, or the like that is configured to thin the base binding material 120 to ensure the surface treatment formulation 100 may be applied to the surface 10 at the desired thickness. It should be understood that the solvent component may be chosen based on the binder component of the base binding material 120 or filler material 140 being used or vice versa. Furthermore, the solvent component may be about 60-90% weight of the base binding material 120. Accordingly, the base binding material 120 may include at least 60%, 65%, 70%, or 75% by weight of the solvent component or at most 75%, 80%, 85%, or 90% by weight of the solvent component (e.g., about 65-85% by weight of the base binding material 120, about 60-70% by weight of the base binding material 120, etc.).

In accordance with some example embodiments, the base binding material 120 may also include a pigment component. The pigment component may be configured to impart a desired color or opacity to the base binding material 120. When the base binding material 120 includes a pigment component, the pigment component may be about 10-30% weight of the base binding material 120. Accordingly, the base binding material 120 may include at least 10%, 12%, 15%, or 18% by weight of the pigment component or at most 20%, 22%, 25%, 28% or 30% by weight of the pigment component (e.g., about 15-25% by weight of the base binding material 120, about 17-25% by weight of the base binding material 120, etc.).

As further shown in FIG. 2, the surface treatment formulation 100 may also include a filler material 140. The filler material 140 may be configured to decrease the skid resistance (i.e., lower friction resistance) of the surface 10. In this respect, the filler material 140 may be a filler material that is configured to lower the skid resistance of the surface 10 to at least about 60 British Pendulum Number (BPN). In this respect, the total reduction of skid resistance value may be based on the type of surface to which the surface treatment formulation 100 is applied. For example, the filler material 140 may be configured to reduce skid resistance by about 50% when the surface 10 is galvanized steel or about 25% when the surface 10 is concrete.

In order to form the surface treatment formulation 100, the filler material 140 may be configured to be mixed with the base binding material 120—either by premixing the filler material 140 with the base binding material 120 prior to applying to the surface 10 or applying the filler material 140 to the base binding material 120 after the base binding material 120 has been applied to the surface 10—in order to embed or anchor the filler material 140 within the base binding material 120. In this regard, the filler material 140 may be formed of or include a plurality of particles that may be distributed throughout the base binding material 120. The mass median diameter (i.e., D50 diameter) of each of the particles may be less than about 30 microns. D50 is defined as the size that 50% of the particle is below this value and another 50% is above this value. The size of each of the particles being about 20-30 microns results in a more effective alignment of the particles in the surface treatment formulation 100 thereby ensuring the surface 10 is a slippery surface upon activation as discussed in more detail below.

In some cases, the filler material 140 may be a lubricant, such as a wet or dry lubricant. FIG. 2 is representative of example embodiments where the lubricant is a dry lubricant. As shown in FIG. 2, the dry lubricant may include or be formed of sheet-like, planar, acicular, or lamellar structures or particles 142 with weak inter-lamellar strength to impart low-friction properties on the surface 10 to which the filler material 140 is applied. The lamellar particles 142 of the filler material 140 may be configured to reduce friction or decrease skid resistance on the surface 10. In this regard, the lamellar particles 142 may be arranged in a plate-like arrangement in a parallel direction to the surface 10 to which the lamellar particles 142 are applied.

Figure 3:
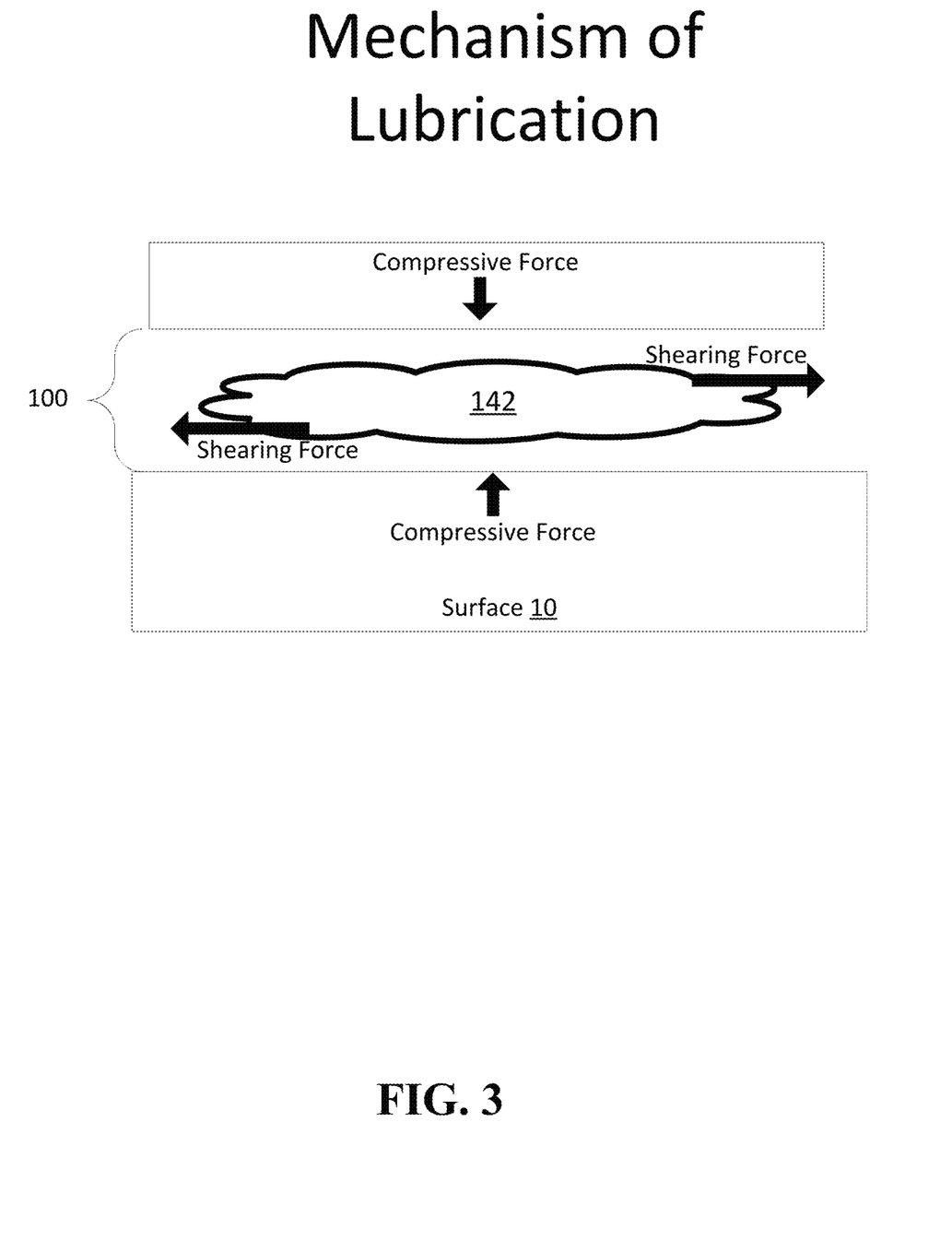
FIG. 3 illustrates a diagrammatic representation of lamellar particles of a dry lubricant.

FIG. 3 is representative of example embodiments where the dry lubricant is formed of lamellar particles 142 (i.e., lubricating particles). As shown in FIG. 3, when a weak compressive force is applied (such as a person climbing surface 10), the lamellar particles 142 are configured to slide under weak shear forces and adhere to sliding surfaces thus reducing friction to create a slippery surface. In this regard, when a force is applied to the surface treatment formulation 100 that includes the filler material 140, the lamellar particles 142 of the filler material 140 may slide under weak shear forces and adhere to the surface 10 thus reducing friction of the surface 10. In other words, in response to pressure (e.g., from an individual trying to climb the perimeter barrier 2) on the surface treatment formulation 100, the binder component of the base binding material 120 may be configured to deform, for example due to the softness of the binder component as discussed above, and compress at least a portion of the filler material 120 to the surface 10 thereby reducing a coefficient of friction at the surface 10 to create a slippery surface. In this regard, the filler material 140 may be configured to reduce the coefficient of friction of the surface 10 to less than about 0.2 at a normal load of about 5 Newtons.

The dry lubricant may be or include, for example, a combination of any of the following: graphite, hydrated magnesium silicate (talc), Teflon, boron nitride, molybdenum disulfide, boron nitride, tungsten disulfide, or nano-clays. In accordance with example embodiments, the surface treatment formulation 100 may include from about 20% to 60% by weight of the filler material 140. Accordingly, the surface treatment formulation 100 may include at least, 20%, 25%, 30%, 35%, 40%, or 45% by weight of the filler material 140 or at most 45%, 50%, 55%, or 60% by weight of the filler material 140 (e.g., about 35-55% by weight of the filler material 140, about 40-50% by weight of the filler material 140, etc.). It should be understood, however, that the percentage weight of the filler material 140 in the surface treatment formulation may be based the type of filler material 140 used. For example, when the filler material 140 used in the surface treatment formulation 100 is a dry lubricant such as graphite, the filler material 140 may be about 20-40% of the surface treatment formulation 100. However, when the filler material 140 used in the surface treatment formulation 100 is a dry lubricant such as talc, the filler material 140 may be about 40-60% of the surface treatment formulation 100.

In some cases, when the filler material 140 of the surface treatment formulation 100 is a dry lubricant, the surface treatment formulation 100 may be configured to be activated in order to further reduce the skid resistance of the surface 10 to which the surface treatment formulation 100 is applied. In particular, the surface treatment formulation 100 may be activated to expose the lamellar particles 142 thereby increasing or causing the formation of a slippery surface on the surface 10 to inhibit the scaling or climbing of the surface 10. In this regard, the activation of the surface treatment formulation 100 may be by any means that abrades the surface treatment formulation 100 a predefined depth 150 to expose the dry lubricant filler. This predefined depth 150 may be about 150-250 microns of the surface treatment formulation 100. Accordingly, the predefined depth may be from at least 150, 160, 170, 180, 190, or 200 microns of the surface treatment formulation 100 or at most 200, 210, 220, 230, 240, or 250 microns of the surface treatment formulation 100 (e.g., about 175-225 microns of the surface treatment formulation 100, about 190-230 microns of the surface treatment formulation 100, etc.).

The activation of the surface treatment formulation 100 may include the application of mechanical, chemical, ultraviolet light, sand blasting, or similar activation mechanisms or any combination thereof to the surface 10 on which the surface treatment formulation 100 is applied. These activation mechanisms may be configured to abrade or degrade the surface treatment formulation 100 in order to expose the filler material 140. In particular, the mechanical activation may include, for example, scuffing the surface treatment formulation 100 to the predefined depth. The scuffing of the surface treatment formulation 100 may be in a vertical, horizontal, or circulation direction relative to the ground when the structure 10 is erect. However, in some cases, vertical or circular scuffing may reduce the skid resistance of the surface 100 at a higher rate than horizontal scuffing. In this regard, horizontal scuffing may create horizontal striations on the structure 10 thereby increasing the skid resistance. Furthermore, scuffing with a more porous scuffing mechanism (e.g., scouring pads) may even further reduce the skid resistance of the surface 100 in comparison to a less porous scuffing mechanism (e.g., 220 and 240 grit sandpaper).

The chemical activation may include, for example, the application of anatase titanium dioxide ($TiO_2$), aerosol graphite, or the like to the surface treatment formulation 100 in order to degrade the surface treatment formulation 100 to the predefined depth 150. In particular, anatase $TiO_2$ is a photocatalyst that is configured to generate radicals when exposed to UV light over a period such as 7-21 days. The generation of the radials may degrade the base binding material 120 in order to expose the filler material 140. Furthermore, in order to activate the surface treatment formulation 100, the surface treatment formulation 100 may be exposed to UV light for a predefined period of time, such as 20-30 days.

Figure 4:
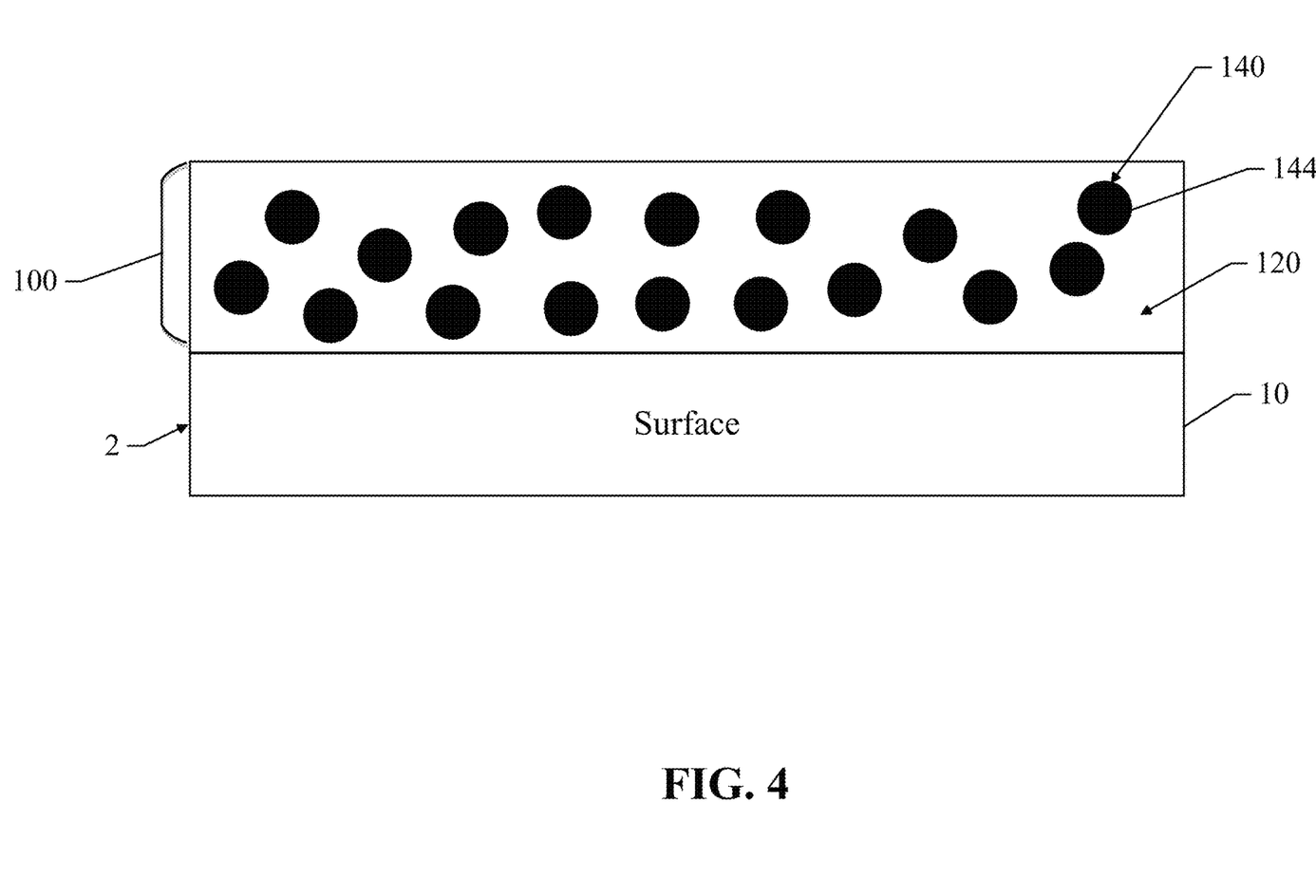
FIG. 4 illustrates a diagrammatic representation of a surface treatment formulation in accordance with a further example embodiment.

As mentioned above, in some example embodiments, the filler material 140 may be a wet lubricant. FIG. 4 illustrates an example embodiment where the filler material 140 of the surface treatment formulation 100 is a wet lubricant. When the filler material is a wet lubricant, droplets 144 of the lubricant may be added directly to the base binding material 140. In particular, the droplets 144 of the wet lubricant may be configured to rupture in response to an application of moderate pressure to the surface treatment formulation 100 thereby causing the filler material 140 to make the surface 10 a slippery surface. In other words, in response to an individual attempting to climb the surface 10, the droplets 144 may be configured to rupture and thereby cause a slippery surface.

While droplets 144 of wet lubricant may be added directly to the base binding material 120, in some cases, particularly when the weather or climate may be more extreme, the droplets 144 may be first encapsulated within microspheres by polymerizing a polymer shell around the droplets 144 in order to protect the wet lubricant from the environmental conditions. The resulting microspheres may then be added to the base binding material 120. In some cases, the wet lubricant may include or be, for example, a light mineral oil, heavy mineral oil, silicone oil glycerol, or like.

Figure 5:
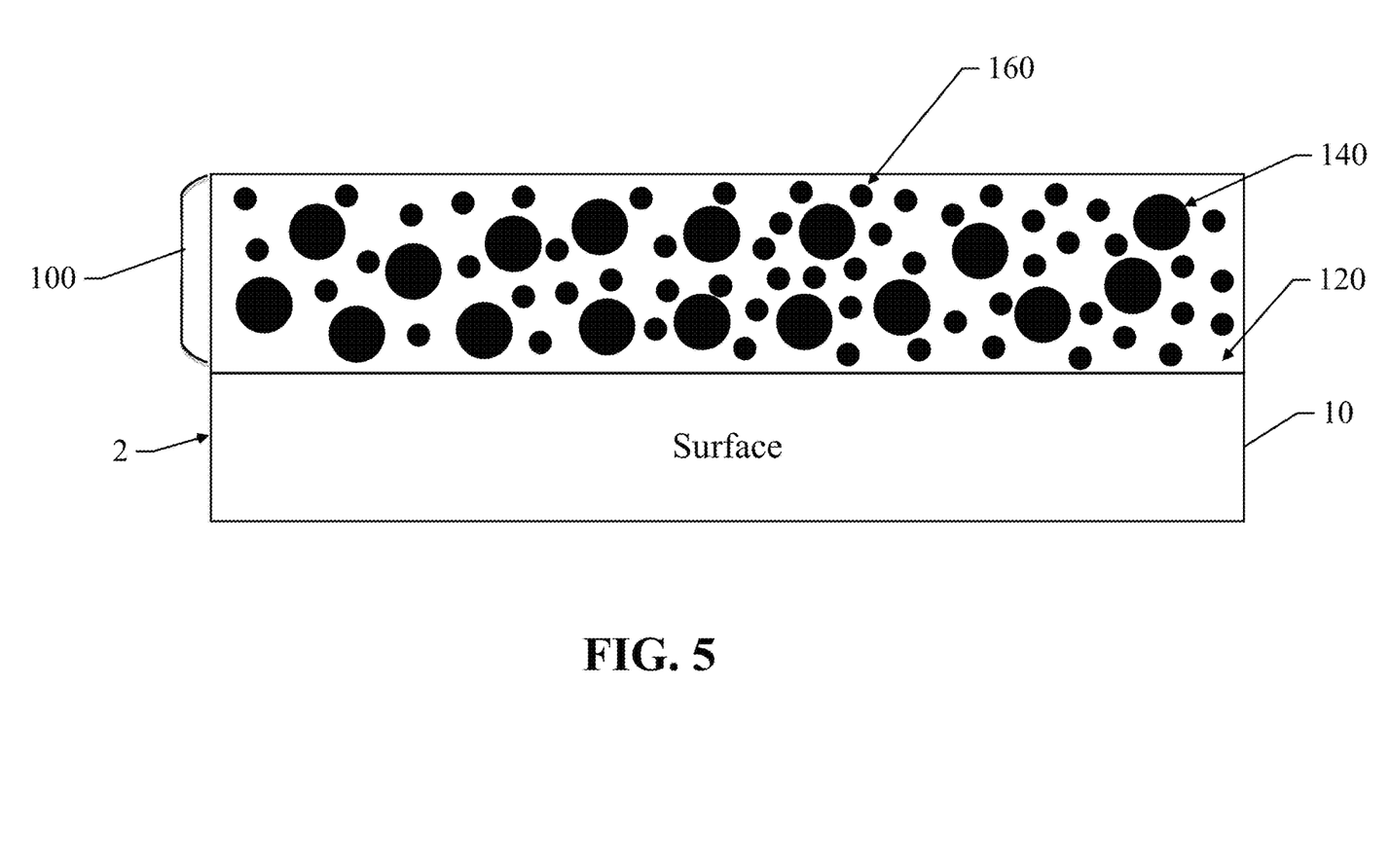
FIG. 5 illustrates a diagrammatic representation of a surface treatment formulation in accordance with an even further example embodiment.

FIG. 5 illustrates a surface treatment formulation 100 in accordance with a further example embodiment. In this regard, the surface treatment formulation 100, in addition to the base binding material 120 and the filler material 140, may further include a coupling agent 160. The coupling agent 160 may be configured to enhance the adherence of the filler material 140 in the base binding material 120 to ensure the surface treatment formulation 100 may be applied in a uniform manner on the surface 10. In some cases, the coupling agent 160 may be a siloxane.

Accordingly, as described herein, a surface treatment formulation 100 configured to inhibit scaling or climbing of a surface 10 is provided. The surface treatment formulation 100 may include a base binding material 120, such as water-based epoxy or water-based acrylic resin, mixed with a filler material 140, such as talc or graphite. In this regard, the surface treatment formulation 100 may include 20-60% by weight talc or graphite. The surface treatment formulation 100 may be applied to the surface 10 and then activated in order to expose the filler material 140 thereby causing formation of a slippery surface to inhibit the scaling or climbing of the surface 10. In this regard, to activate the filler material 140, the surface 10 may be scuffed in a vertical direction relative to the ground in order to activate the filler material 140.

Figure 6:
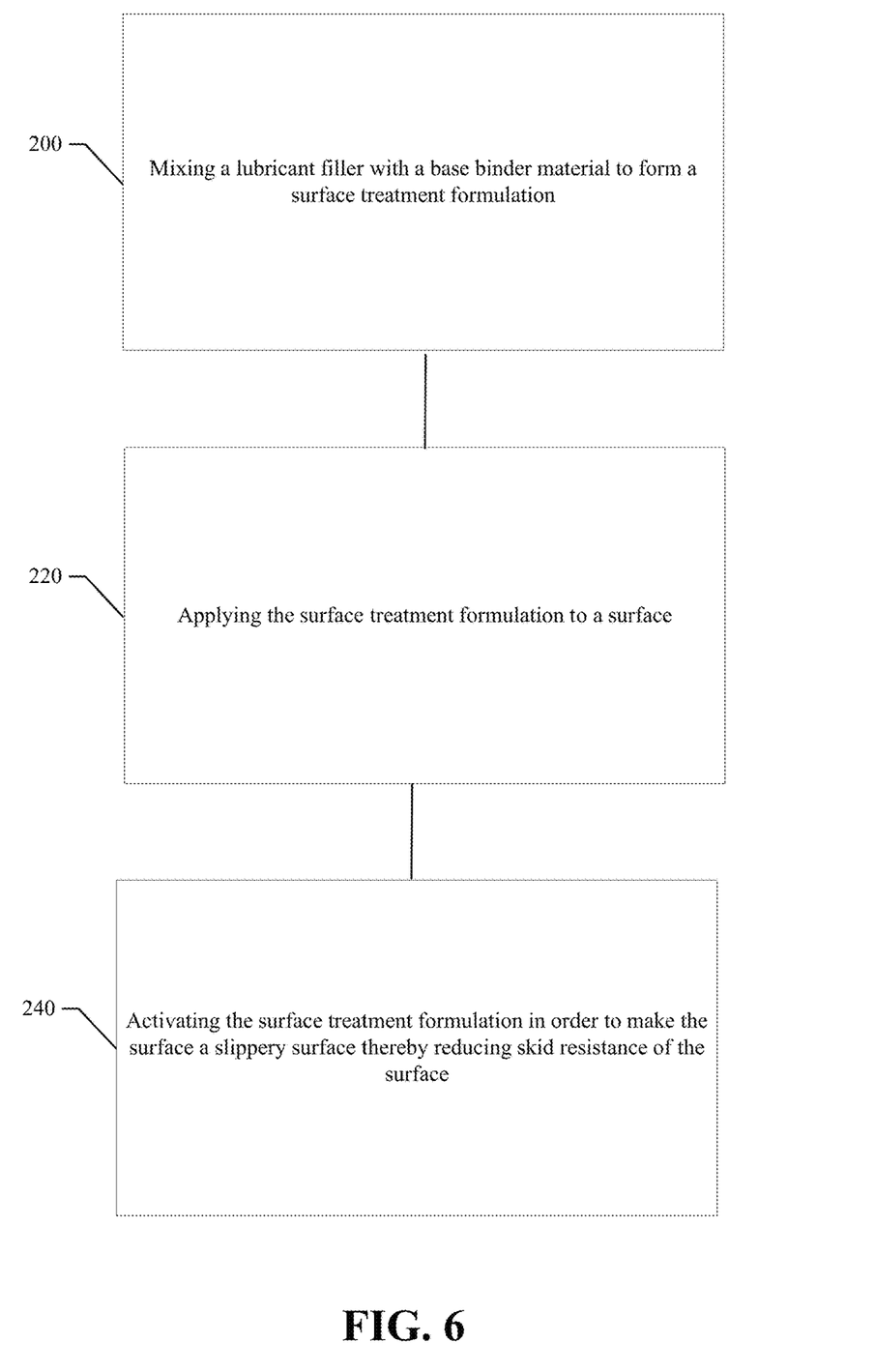
FIG. 6 illustrates a method for reducing a skid resistance of a perimeter barrier in accordance with an example embodiment.

FIG. 6 illustrates a method of reducing skid resistance of the surface 10. As shown in FIG. 6, the method may include the initial step of mixing the filler material 140 with the base binding material 120 to form the surface treatment formulation 100 at operation 200. As discussed above, in some cases, the coupling agent 160 may also be mixed with the filler material 140 and the base binding material 120 to form the surface treatment formulation 100

The method may also include applying the surface treatment formulation 100 to the surface 10 of the perimeter barrier 2 at operation 220. As mentioned previously, the application of the surface treatment formulation 100 to the surface 10 may be done by any brushing, rolling, or spraying technique known in the art. However, in some cases, the surface treatment formulation 100 may be applied in vertical strokes relative to the surface 10 to ensure the filler material 140 is aligned parallel to the surface 10 to ensure the formation of a slippery surface on the surface 10.

The method may also include the activation of the surface treatment formulation 100 to make the surface 10 a slippery surface thereby reducing skid resistance of the surface 10 at operation 240. The activation of the surface treatment formulation 100 may be accomplished by any mechanical, chemical, UV light, sand blasting, or similar activation mechanisms known in the art. For example and as discussed in detail above, the activation of the surface treatment formulation 100 may be accomplished by abrading the surface 10 a predefined depth to expose the filler material 140. The abrasion may be done by scuffing the surface 10 in a vertical or circular direction. However, as detailed above, the activation of the surface treatment formulation 100 may be accomplished through exposing the surface 10 to UV light for a predefined period or the like.

Thus, in accordance with example embodiments herein, a surface treatment formulation may be provided. The surface treatment formulation may be configured to inhibit scaling or climbing of a surface. The surface treatment formulation may include a base binding material configured to adhere to the surface and a filler material embedded in the base binding material. The filler material may include a dry lubricant having a layered lamellar structure or low inter filler interaction. Furthermore, the surface treatment formulation may be configured to be activated in order to expose the filler material thereby causing formation of a slippery surface to inhibit the scaling or climbing of the surface.

In some embodiments, the features described above may be augmented or modified, or additional features may be added. These augmentations, modifications, and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the dry lubricant may be graphite. Additionally or alternatively, the graphite may be 20-40% weight of the surface treatment formulation. Additionally or alternatively, the dry lubricant may be hydrated magnesium silicate. Additionally or alternatively, the hydrated magnesium silicate may be 40-60% weight of the surface treatment formulation. Additionally or alternatively, the dry lubricant may include a plurality of particles having a mass median diameter of less than about 30 microns. Additionally or alternatively, the activation of the surface treatment formulation may include the application of mechanical, chemical, ultraviolet light, or sand blasting activation mechanisms. Additionally or alternatively, the mechanical activation mechanism may include abrading the surface treatment formulation a predefined depth to expose the dry lubricant. Additionally or alternatively, the slippery surface may have a coefficient of friction of less than about 0.2 at a load of about 5 Newtons. Additionally or alternatively, the base binding material may include a binder component and a solvent component. Additionally or alternatively, the binder component may be an acrylic resin. Additionally or alternatively, the solvent component may be water. Additionally or alternatively, the surface treatment formulation may further include a coupling agent configured to enhance the adherence of the filler material to the base binding material. Additionally or alternatively, the coupling agent may be a siloxane coupling agent.

In one example embodiment, Watson™ Aqua-Shield may be used as a binder and combined with 25 wt % graphite powder (with an average particle size of 25 µm) and mixed with a pneumatic paint shaker for 10 minutes. The resulting mixture may be applied to a vertical surface using a brush in long vertical continuous strokes perpendicular to the ground. Once dry, the mixture may be scuffed with a scouring pad (e.g., Scotch-Brite™ General Purpose Scouring Pad 96) in a vertical direction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A surface treatment formulation configured to inhibit scaling or climbing of a surface, the formulation comprising:
    a base binding material configured to adhere to the surface, wherein the base binding material comprises a binder component and a solvent component; and
    a filler material comprising a plurality of particles embedded in the base binding material in a layered lamellar structure, the plurality of particles comprising a dry lubricant and having a planar or acicular structure,
    wherein the surface treatment formulation is configured to be activated in order to expose the filler material thereby causing formation of a slippery surface to inhibit the scaling or climbing of the surface.

2. The surface treatment formulation of claim 1, wherein the dry lubricant is graphite.

3. The surface treatment formulation of claim 2, wherein the graphite is 20-40% weight of the surface treatment formulation.

4. The surface treatment formulation of claim 1, wherein the dry lubricant is hydrated magnesium silicate.

5. The surface treatment formulation of claim 4, wherein the hydrated magnesium silicate is 40-60% weight of the surface treatment formulation.

6. The surface treatment formulation of claim 1, wherein the plurality of particles have a mass median diameter of less than about 30 microns.

7. The surface treatment formulation of claim 1, wherein the activation of the surface treatment formulation comprises application of mechanical, chemical, ultraviolet light, or sand blasting activation mechanisms.

8. The surface treatment formulation of claim 7, wherein the mechanical activation mechanism comprises abrading the surface treatment formulation a predefined depth to expose the dry lubricant.

9. The surface treatment formulation of claim 1, wherein the slippery surface has a coefficient of friction of less than about 0.2 at a load of about 5 Newtons.

10. The surface treatment formulation of claim 1, wherein the binder component is an acrylic resin.

11. The surface treatment formulation of claim 10, wherein the solvent component is water.

12. The surface treatment formulation of claim 1, wherein the surface treatment formulation further comprises a coupling agent configured to enhance adherence of the filler material to the base binding material.

13. The surface treatment formulation of claim 12, wherein the coupling agent is a siloxane coupling agent.

14. A method for reducing skid resistance of a surface:
    embedding a filler material comprising a plurality of particles in a base binding material in a layered lamellar structure to form a surface treatment formulation, the plurality of particles comprising a dry lubricant and having a planar or acicular structure, and the base binding material comprising a binder component and a solvent component;
    applying the surface treatment formulation to the surface; and activating the surface treatment formulation in order to expose the filler material thereby causing formation of a slippery surface to reduce the skid resistance of the surface.

15. The method of claim 14, wherein activating the surface treatment formulation comprises abrading the surface treatment formulation a predefined depth.

16. The method of claim 15, wherein abrading the surface treatment formulation comprises scuffing the surface treatment formulation in a vertical direction relative to the surface, in a circular direction relative to the surface, or both.

17. The method of claim 14, wherein activating the surface treatment formulation comprises exposing the surface treatment formulation to UV light for a predefined time period.

18. The method of claim 14, wherein the formation of a slippery surface reduces the skid resistance of the surface to below about 50 British Pendulum number (BPN).

19. A surface treatment comprising:
a base binding material configured to adhere to a surface, wherein the base binding material comprises a binder component and a solvent component; and
a filler material comprising a plurality of particles embedded in the base binding material in a layered lamellar structure, the plurality of particles comprising a dry lubricant and having a planar or acicular structure.

20. The surface treatment formulation of claim 1, wherein the binder component is selected from the group consisting of an acrylic resin, an epoxy resin, a polyurethane, an alkyd resin, or combinations thereof.

* * * * *